United States Patent
Dunham et al.

(10) Patent No.: US 7,448,649 B2
(45) Date of Patent: Nov. 11, 2008

(54) GAS GENERATOR

(75) Inventors: Steven M-G Dunham, Mt. Clemens, MI (US); Bruce A. Stevens, Oakland, MI (US)

(73) Assignee: Automotive Systems Laboratory, Inc., Armada, MI (US)

( * ) Notice: Subject to any disclaimer, the term of this patent is extended or adjusted under 35 U.S.C. 154(b) by 0 days.

(21) Appl. No.: 11/282,063

(22) Filed: Nov. 16, 2005

(65) Prior Publication Data

US 2006/0163864 A1   Jul. 27, 2006

Related U.S. Application Data

(60) Provisional application No. 60/628,573, filed on Nov. 17, 2004.

(51) Int. Cl.
*B60R 22/46* (2006.01)

(52) U.S. Cl. .................. 280/806; 280/801.1; 297/480

(58) Field of Classification Search ............. 280/728.1, 280/801.1, 806, 807; 297/480
See application file for complete search history.

(56) References Cited

U.S. PATENT DOCUMENTS

| | | | |
|---|---|---|---|
| 2,995,088 A | 8/1961 | Asplund | |
| 4,213,581 A * | 7/1980 | Andres et al. ............. | 242/374 |
| 4,558,832 A | 12/1985 | Nilsson .................... | 242/374 |
| 4,597,546 A | 7/1986 | Yamamoto et al. ........ | 242/382.2 |
| 5,222,994 A | 6/1993 | Hamaue .................... | 242/374 |
| 5,326,042 A * | 7/1994 | Nishizawa et al. ......... | 242/374 |
| 5,451,008 A | 9/1995 | Hamaue .................... | 242/374 |
| 5,553,803 A | 9/1996 | Mitzkus et al. ............ | 242/374 |
| 5,553,890 A * | 9/1996 | Buhr et al. ................ | 280/806 |
| 5,639,120 A * | 6/1997 | Kmiec et al. .............. | 280/806 |
| 5,667,161 A * | 9/1997 | Mitzkus et al. ............ | 242/374 |
| 5,676,397 A * | 10/1997 | Bauer ....................... | 280/806 |
| 5,743,480 A * | 4/1998 | Kopetzky et al. .......... | 242/374 |
| 5,772,243 A | 6/1998 | Green et al. | |
| 5,833,369 A | 11/1998 | Heshmat ................... | 384/105 |
| 5,899,399 A * | 5/1999 | Brown et al. .............. | 242/374 |
| 5,902,049 A | 5/1999 | Heshmat ................... | 384/106 |
| 5,906,328 A * | 5/1999 | Hamaue et al. ............ | 242/374 |
| 5,941,752 A | 8/1999 | Liebermann ............... | 446/220 |
| 6,009,809 A | 1/2000 | Whang ..................... | 102/202.7 |
| 6,056,314 A * | 5/2000 | Shirk et al. ................ | 280/728.2 |
| 6,079,745 A * | 6/2000 | Wier ........................ | 280/806 |
| 6,213,513 B1 * | 4/2001 | Grabowski et al. ......... | 280/806 |
| 6,378,901 B1 * | 4/2002 | Yamazaki et al. .......... | 280/741 |
| 6,419,177 B2 | 7/2002 | Stevens .................... | 242/374 |
| 6,419,271 B1 | 7/2002 | Yamada et al. ............ | 280/806 |
| 6,460,794 B1 | 10/2002 | Stevens .................... | 242/374 |

(Continued)

*Primary Examiner*—Kevin Hurley
*Assistant Examiner*—Barry Gooden, Jr.
(74) *Attorney, Agent, or Firm*—L.C. Begin & Associates, PLLC.

(57) ABSTRACT

A gas generating system (24) is provided including a gas generant container (34) and an initiator (28). The initiator (28) is positioned exterior of the gas generant container (34) so as to enable fluid communication with the container (34) upon activation of the initiator (28). A gas generant composition (32) is positioned within the container (34). The gas generant container (34) may have sufficient rigidity to maintain a predetermined shape prior to positioning of the gas generant (32) therein, and is penetrable by combustion products resulting from activation of the initiator (28). A seatbelt device (150) and a vehicle occupant restraint system (180) incorporating a gas generating system as described herein are also disclosed.

9 Claims, 4 Drawing Sheets

U.S. PATENT DOCUMENTS

| | | | |
|---|---|---|---|
| 6,460,935 B1 | 10/2002 | Rees et al. | 297/478 |
| 6,505,790 B2 * | 1/2003 | Stevens | 242/374 |
| 6,505,837 B1 | 1/2003 | Heshmat | 277/411 |
| 6,520,443 B2 * | 2/2003 | Stevens | 242/374 |
| 6,568,184 B2 | 5/2003 | Blackburn et al. | 60/636 |
| 6,676,057 B2 * | 1/2004 | Maierhofer et al. | 242/374 |
| 6,682,616 B1 | 1/2004 | Yamato et al. | 149/45 |
| 6,685,220 B2 | 2/2004 | Ohhashi | 280/733 |
| 6,805,376 B2 | 10/2004 | Mizuno | 280/737 |
| 6,979,024 B2 * | 12/2005 | Cunningham et al. | 280/806 |
| 7,052,041 B2 | 5/2006 | McCormick | 280/741 |
| 2003/0010247 A1 * | 1/2003 | Miyaji et al. | 102/530 |
| 2003/0025311 A1 * | 2/2003 | Mangum | 280/736 |
| 2004/0150210 A1 * | 8/2004 | Cunningham et al. | 280/806 |
| 2005/0017496 A1 * | 1/2005 | Stevens et al. | 280/806 |
| 2006/0097506 A1 * | 5/2006 | Stevens | 280/806 |
| 2006/0131866 A1 * | 6/2006 | Stevens et al. | 280/806 |

* cited by examiner

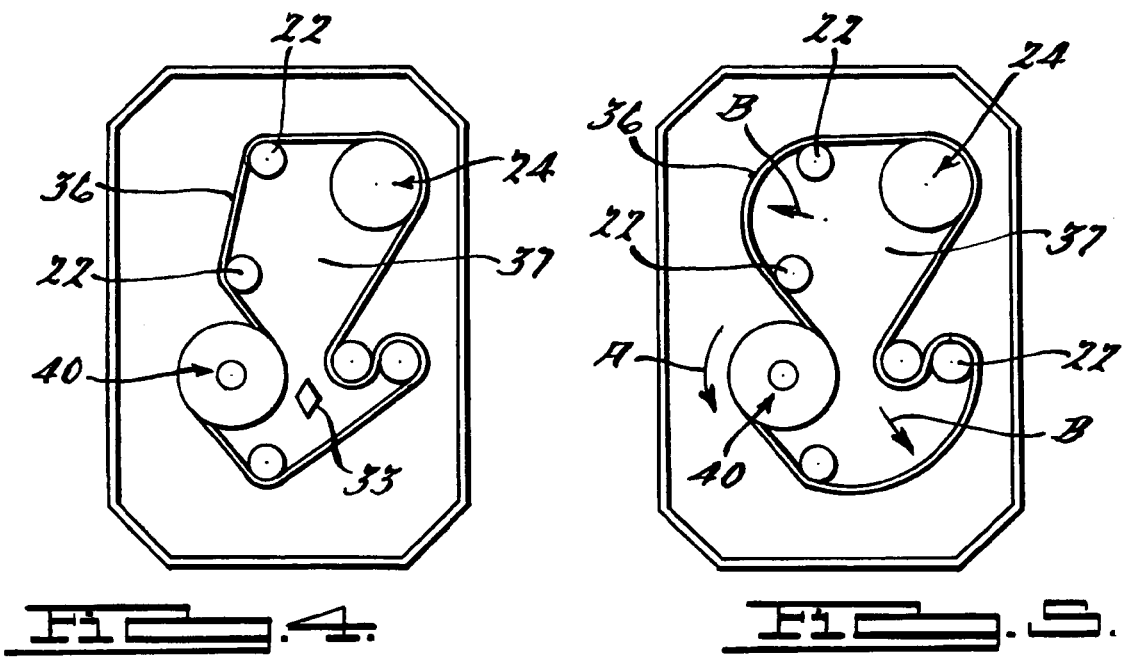
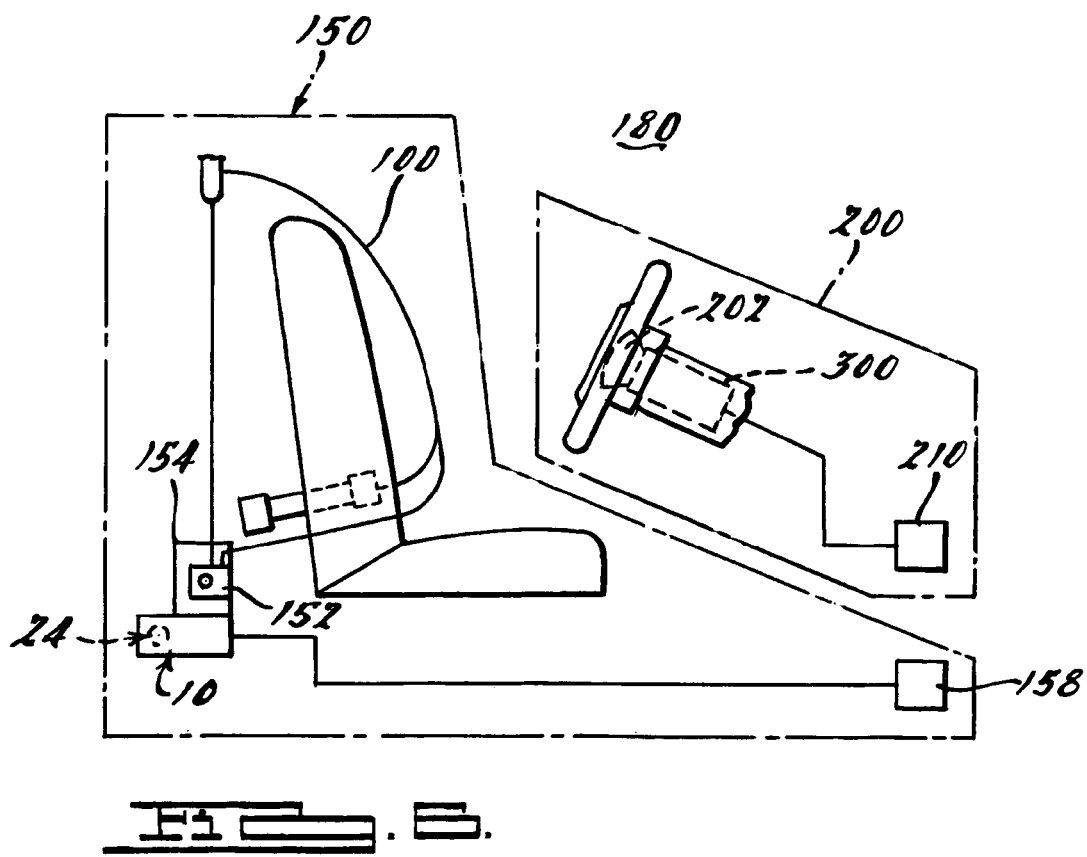

GAS GENERATOR

CROSS REFERENCE TO RELATED APPLICATIONS

This application claims the benefit of provisional application Ser. No. 60/628,573, filed on Nov. 17, 2004.

BACKGROUND OF THE INVENTION

The present invention relates generally to gas generating systems and, more particularly, to gas generators used in vehicle occupant protection systems and related components, such as seatbelt pretensioners.

Gas generators used in seatbelt pretensioners are known as micro gas generators due to the relatively small size of the gas generator. Exemplary pretensioners using such micro gas generators include those described in U.S. Pat. Nos. 6,460,794, 6,505,790, 6,520,443, and 6,419,177, incorporated herein by reference. Micro gas generators generally contain an initiator including an initiator charge, a header or initiator holder in which the initiator is received and secured therein, and a gas generant composition which ignites and burns in response to ignition of the initiator to produce gases for actuating the seatbelt pretensioner.

The gas generant composition must be positioned so as to enable ignition thereof by the initiator upon activation of the micro gas generator. In typical micro gas generator designs, a casing containing the gas generant composition is hermetically attached to the initiator holder, with the gas generant composition in direct fluid communication with a casing containing the initiator charge. Upon activation of the initiator, by-products from initiator charge combustion fracture or otherwise penetrate the initiator charge casing, igniting the gas generant. However, the need to provide features enabling hermetic attachment of the gas generant casing to the initiator holder complicates the design of the holder. For example, crimp tabs or flanges formed in the holder for accommodating fasteners for casing attachment, as well as grooves and surfaces formed along the holder to accommodate compliant seals for hermetically encapsulating the gas generant, increase the complexity and cost of fabricating the initiator holder. Furthermore, the provision of sealing elements (for example, 0-rings or other gaskets) increases the assembly part count, and the cost and time associated with manufacturing the assembly.

SUMMARY OF THE INVENTION

A gas generating system is provided including a gas generant container and an initiator. The initiator is positioned exterior of the gas generant container so as to enable fluid communication with the container upon activation of the initiator. A gas generant composition is hermetically sealed in an interior of the container. The gas generant container has sufficient rigidity to maintain a predetermined shape prior to positioning of the gas generant therein, and is penetrable by combustion products and/or force resulting from activation of the initiator. Stated another way, combustion products may be defined as actual chemical products of combustion, or the force generated by combustion, or any other constituents attributed to combustion, or a combination thereof.

BRIEF DESCRIPTION OF THE DRAWINGS

FIG. 4 is a cross-sectional plan view of the pretensioner of FIG. 1 showing the arrangement of the strap prior to pretensioner activation;

FIG. 5 is the view of FIG. 4 showing the extension of the strap after pretensioner activation; and FIG. 6 is a schematic representation of an exemplary vehicle occupant restraint system including a micro gas generator incorporating a blast director in accordance with the present invention.

DETAILED DESCRIPTION

Figure 1:
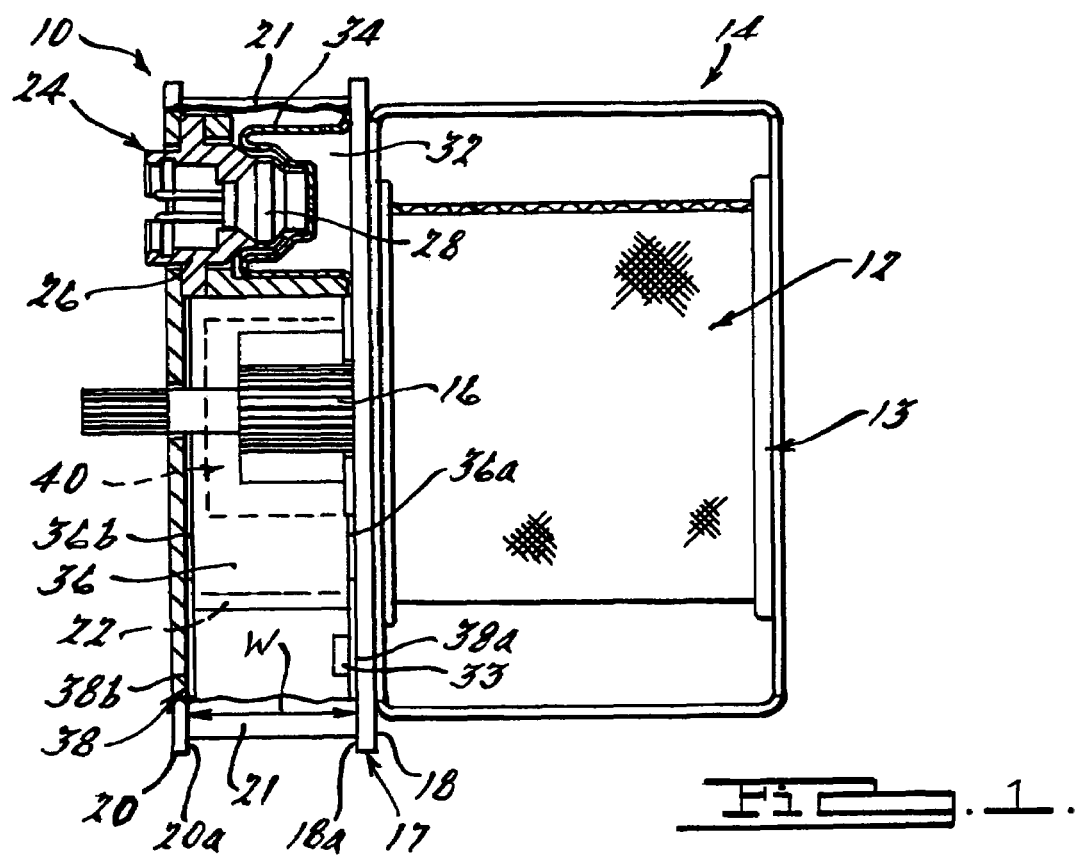
FIG. 1 is a cross-sectional side view of a pretensioner incorporating a gas generator in accordance with the present invention.
Figure 2:
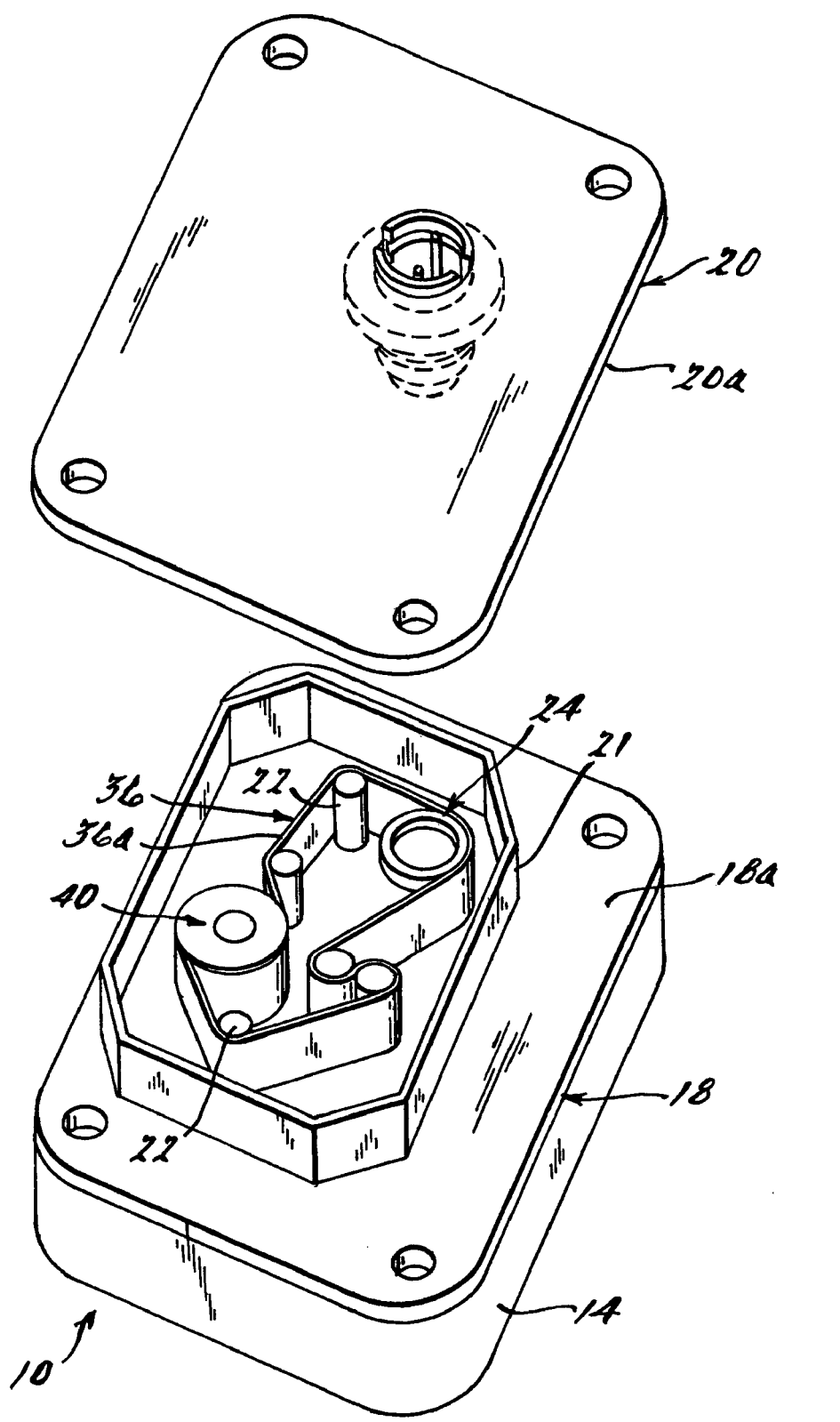
FIG. 2 is a perspective view of the pretensioner shown in FIG. 1.

Referring to FIGS. 1 and 2, a pyrotechnic pretensioner 10 in accordance with one embodiment of the invention is employed to pretension a seat belt 12 wound about a reel 13 of a conventional seat belt retractor 14. "Pretensioning" is generally defined as taking up slack in the seat belt in the event of sudden deceleration or collision. A webbing reel retractor shaft 16 extends from retractor 14 into pretensioner 10 and thereby cooperates with the pretensioner 10 to tighten the seatbelt 12 in the event of an accident. The pretensioner of the present invention has generic application, for example only, in seatbelt assemblies having seatbelt retractors as described in U.S. Pat. Nos. 4,558,832 and 4,597,546, incorporated herein by reference.

Referring to FIGS. 1 and 2, pretensioner 10 includes a housing 17 having a first plate 18 and a second plate 20 spaced apart from the first plate. The region between plates 18 and 20 defines an interior of the housing. In one embodiment, a plurality of spacers 22 is secured between first plate 18 and second plate 20 to secure the plates in position relative to one another, thereby providing and maintaining the spacing between the plates. Separation between plates 18 and 20 is also (or alternatively) provided by an outer wall 21 extending between the plates and substantially along the outer edges of the plates to enclose the components of the pretensioner described below. Plates 18 and 20 have opposed respective interior faces 18a and 20a. Faces 18a and 20a are substantially flat.

Spacers 22 each have a pair of opposite end portions with each end portion being secured to a respective one of first plate 18 or second plate 20 using one of a variety of known methods, such as welding, fasteners, adhesives, etc. Spacers 22 are positioned within housing 17 to serve as guides around which a strap 36 (described below) is wound. Also, in one embodiment, spacers 22 have substantially equal lengths to provide a substantially equal separation distance between plates 18 and 20 along the extent of interior faces 18a and 20a. Plates 18, 20 and spacers 22 are formed from steel, aluminum, metal alloys, plastic, and/or other known materials suitable for the applications described herein.

Figure 3:
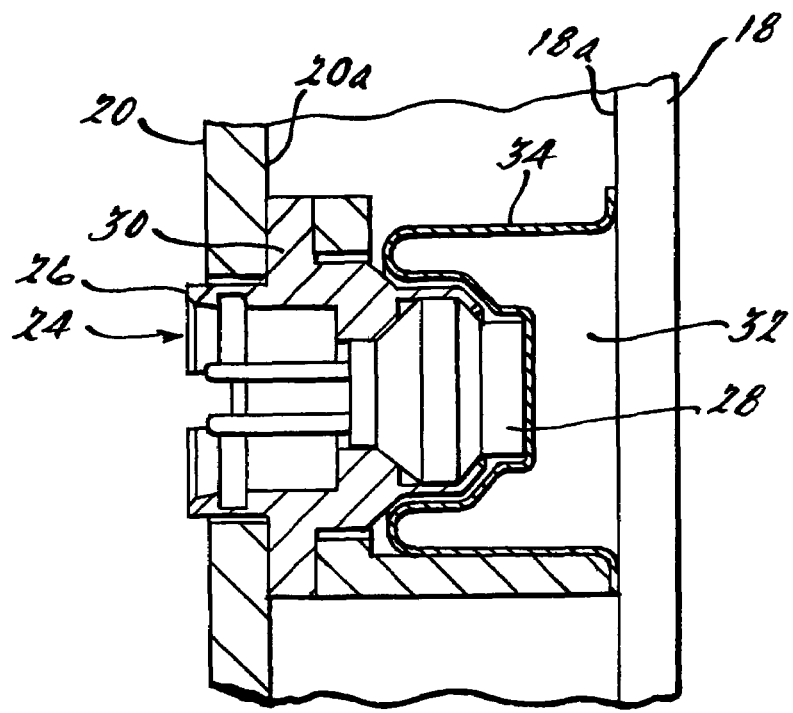
FIG. 3 is a cross-sectional side view of a gas generator in accordance with the present invention.

Referring to FIG. 3, a gas generating system 24 is positioned in the interior of the housing for generating inflation gas used to activate pretensioner 10. Gas generating system 24 includes an initiator assembly 26 comprising a header or initiator holder 30, and an initiator 28 secured in header 30.

On example of an initiator suitable for use in the present invention is described in U.S. Pat. No. 6,009,809, incorporated herein by reference. Initiator 28 may be secured in header 30 using any one of several known methods, such as crimping, welding, press-fitting, molding, or the application of adhesives or fasteners. Alternatively, initiator 28 may be secured within a portion of the pretensioner assembly without the use of a holder, using one or more of the methods set forth above.

Header 30 is also secured to one of first plate 18 or second plate 20 using any one of several known methods, such as crimping, welding, press-fitting, or the application of adhesives or fasteners. Header 30 may be formed from a metal, a metal alloy, or a polymeric material.

A gas generant composition 32 is positioned within housing 17, between first plate 18 and second plate 20 in a location that enables fluid communication with initiator 28 upon activation of the initiator. Exemplary gas generant compositions suitable for use in the gas generator of the present invention include nitrocellulose; compounds containing a mixture of nitroguanidine, potassium perchlorate and cellulose acetate butyrate; compounds containing a mixture of epoxy and potassium perchlorate; and compounds containing a mixture of epoxy, silicone, and potassium perchlorate. These compositions illustrate, but do not limit, useful gas generant compositions in accordance with the present invention.

In the embodiment shown in FIG. 3, a container 34 is provided for enclosing and positioning gas generant composition 32 in relation to initiator 28. In one embodiment, the container 34 is in the form of a cup formed from aluminum, a metal alloy, a polymer material, or any other material that is formable into the shape required for the cup and frangible, meltable, or otherwise penetrable when exposed to the pressure and/or heat and/or other by-products of combustion of the initiator charge. In one aspect of the present invention, gas generant container 34 may be provided with sufficient rigidity to maintain a predetermined shape prior to positioning of the gas generant therein thereby providing an assembly advantage.

Figure 3A:
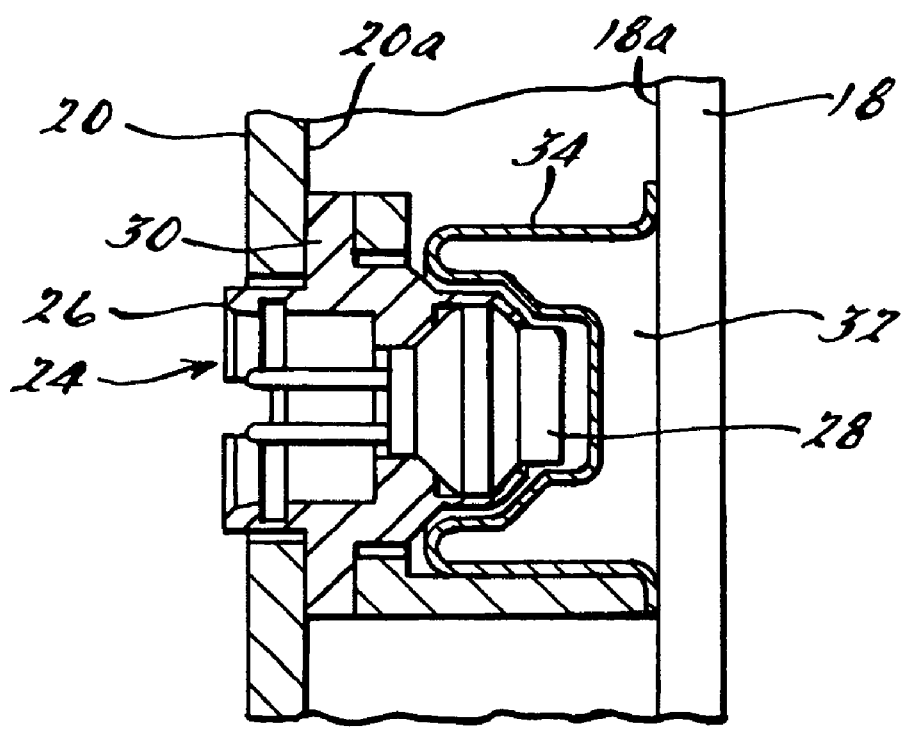
FIG. 3A is a cross-sectional side view schematic of a gas generator in accordance with an alternative embodiment cite present invention.

Cup 34 may be hermetically sealed and positioned and secured relative to initiator 28 so as to enable fluid communication between the cup and initiator charge combustion products upon activation of the initiator. In the embodiment shown in FIG. 1-5, cup 34 is welded or otherwise attached to plates 18, 20 adjacent to or abutting initiator 28 so as to be fracturable by initiator 28, to expose gas generant 32 to ignition products, thereby igniting the gas generant 32. Alternatively, as seen in FIG. 3A, cup 34 may be positioned spaced apart from the initiator and secured to any suitable component of the pretensioner assembly. It should be emphasized that in accordance with the present invention, initiator 28 is operably positioned with respect to cup 34 as explained above, without the need for hermetically sealing and coupling the cup 34 with the initiator 34, as known in the art. Various design options for placement of the initiator 28 within the pretensioner assembly are therefore available given that the cup 34 need not be positioned immediately proximate the initiator 28, but just in operable communication therewith.

Cup 34 may be hermetically sealed by positioning the gas generant composition therein and affixing portions of the cup to the housing or other portion of the pretensioner assembly. Alternatively, the gas generant may be positioned within the cup and the cup hermetically sealed to form a separate subassembly prior to attachment to the pretensioner assembly. Storing the gas generant in a hermetically sealed cup detached from, but positioned proximate, the initiator assembly obviates the need to attach and hermetically seal the gas generant to the initiator assembly itself, thereby simplifying the design of the initiator assembly.

In an alternative embodiment, the gas generant composition is hermetically sealed within a separate packet (for example, a polymer bag) which is positioned within frangible cup 34. Cup 34 is then attached to the pretensioner assembly so as to enable fluid communication between the cup and initiator charge combustion products upon activation of the initiator. This enables a predetermined quantity of gas generant to be easily positioned and secured in a fixed location with respect to the initiator, while obviating the need to hermetically seal cup 34 during assembly.

Referring again to FIGS. 1 and 2, a strap 36 has opposite end portions wrapped around and secured to a portion of a clutch assembly 40 (described below), a body 36a extending between the end portions, and a pair of opposed lateral edges 36b, and 36c. Strap body 36a has a width W between lateral edges 36b and 36c dimensioned to provide a slight clearance fit with first plate 18 and second plate 20, along strap lateral edges 36b and 36c. Body 36a extends from clutch assembly 40 to wrap around spacers 22 and micro gas generator 24, thereby defining an enclosure, generally designated 37 (FIG. 4), bounded by first and second plates 18, 20 and by strap body 36a. Strap 36 is preferably made from steel or some other hard and ductile metal or alloy. Strap 36 may be cut from steel sheet metal, for example. In a manner described below, strap 36 acts as a medium for transferring forces produced by expansion of inflation gases to a clutch assembly (described below), thereby actuating the pretensioner.

Referring again to FIG. 1, a seal 38 is provided for maintaining inflation gases within chamber 37 during extension of strap 36 and the resulting expansion of the chamber. In one embodiment, seal 38 is a compliant foil seal, one example of which is manufactured by Mohawk Innovative Technology, Inc., of Albany, N.Y. The compliant foil seal includes a smooth, compliant foil 38a supported by an elastic strip 38b designed to provide spatially variable stiffness and damping support for foil 38a. The foil and support strip are affixed to interior face 18a of first plate 18, and to interior face 20a of second plate 20. Principles of construction of foil seals usable in the pretensioner of the present invention are described in U.S. Pat. Nos. 5,833,369, and 5,902,049, all incorporated herein by reference. Other embodiments of the foil seal and alternative types of seals suitable for substantially maintaining inflation gases within chamber 37 are also contemplated for use in the pretensioner described herein.

A clutch assembly, generally designated 40, is provided for coupling strap 36 to retractor shaft 16 upon activation of the pretensioner and extension of strap 36. As used herein, the term "clutch assembly" is meant to apply generically to any clutch component or combination of components that are useful in the seatbelt retractor and pretensioner art. Stated another way, a "clutch assembly" is any component or combination of components that exert a rotary force on the retractor shaft 16 and thus produce a pretensioning or tightening of belt 12 by winding the associated webbing reel 13. In general, a portion of clutch assembly 40 has ends of strap 36 secured thereto and is spring-loaded so that slack is substantially removed from the strap prior to activation of the pretensioner. Many such assemblies are known in the art. For example, U.S. Pat. Nos. 5,743,480, 6,419,177 and 5,222,994, incorporated herein by reference, describe a few of the known clutch assemblies suitable for use with the pretensioner of the present invention.

Components of clutch assembly 40 may be die cast from aluminum, steel or suitable alloys thereof. Alternatively, the components may be injection molded if plastic material is used. In a preferred embodiment, the clutch assembly components are formed from hard resilient plastic thereby reducing the weight of pretensioner 10.

Prior to activation, and with reference to FIGS. 4 and 5, pretensioner 10 is operatively disengaged from retractor shaft 16 so as not to interfere with normal operation (i.e., seatbelt unwinding and rewinding) of the retractor. In operation, electrical contacts on initiator 28 communicate with a sensor that signals actuation of pretensioner 10. Upon operation, when initiator 28 receives a signal, from an accelerometer for example, the initiator charge contained in initiator 28 ignites, fracturing or otherwise penetrating the wall of cup 34 containing gas generant composition 32, igniting the gas generant. The gas pressure from combustion of gas generant 32 produces tension forces acting along strap 36, causing a corresponding extension of the strap and resulting in expansion of chamber 37 in the directions indicated by arrows B. As chamber 37 expands, tension on strap 36 forces end portions of strap 36 attached to clutch assembly 40 to pull on the clutch assembly, resulting in a sudden rotation of the portion of the assembly attached to strap 36, in the direction indicated by arrow A. This sudden rotation activates the clutch assembly, causing it to engage retractor shaft 16 and forcing the retractor shaft to rotate in the direction indicated by arrow A, thereby pretensioning the safety belt. In one embodiment of the compliant foil seal previously described, a thin, high pressure gas film is formed between each of strap lateral edges 36b, 36c and a foil surface 38a positioned along a corresponding adjacent interior face of one of plates 18 and 20 during expansion of the inflation gas and the resulting extension of strap 36. This thin gas film separates the foil surface from the lateral edge of strap 36, enabling non-contact movement of strap 36 along plate interior surfaces 18a and 20a and inhibiting leakage of inflation gases between the foil 38a and strap 36. Relative positions of spacers along interior faces 18a and 20a may be determined as required to channel or guide expansion of the strap into desired portions of the housing interior (for example, in cases where the size envelope occupied by housing 17 is restricted to a certain size or configuration).

Referring to FIG. 5, in a particular application, a micro gas generator 24 as described herein is incorporated into a safety belt pretensioner 10 employed in a safety belt assembly 150 used in a vehicle occupant restraint system 180. Safety belt assembly 150 includes a safety belt housing 152 and a safety belt 100 extending from housing 152. A safety belt retractor mechanism 154 (for example, a spring-loaded mechanism) may be coupled to an end portion of the belt. Safety belt pretensioner 10 may be coupled to belt retractor mechanism 154 to actuate the retractor mechanism in the event of a collision. Micro gas generator 24 is adapted to actuate seat belt retractor mechanism 154 to pretension safety belt 160. Typical seat belt retractor mechanisms which may be used in conjunction with safety belt 160 are described in U.S. Pat. Nos. 5,743,480, 5,553,803, 5,667,161, 5,451,008, 4,558,832 and 4,597,546, incorporated herein by reference. Safety belt assembly 150 may be in communication with a known crash event sensor 158 (for example, an inertia sensor or an accelerometer) that is in operative communication with a known crash sensor algorithm (not shown) which signals actuation of belt pretensioner 10 via, for example, activation of initiator 28 (not shown in FIG. 5) in micro gas generator 24. U.S. Pat. Nos. 6,505,790 and 6,419,177 provide illustrative examples of pretensioners actuated in such a manner.

Referring again to FIG. 5, vehicle occupant restraint system 180 may also include additional elements such as an airbag system 200. In the embodiment shown in FIG. 5, airbag system 200 includes at least one airbag 202 and an inflator 300 coupled to airbag 202 so as to enable fluid communication with an interior of the airbag. Airbag system 200 may also include (or be in communication with) a crash event sensor 210. Crash event sensor 210 includes a known crash sensor algorithm that signals actuation of airbag system 200 via, for example, activation of airbag inflator 300 in the event of a collision.

It should be appreciated that safety belt assembly 150, airbag system 200, and more broadly, vehicle occupant protection system 180 exemplify but do not limit gas generating systems contemplated in accordance with the present invention.

Embodiments of the micro gas generator described herein may also have application in other elements typically employed in vehicle occupant protection systems. A vehicle occupant protection system may be defined to include at least one of the following: a device such as an airbelt, a buckle pretensioner, and/or a pyrotechnic actuator. Embodiments of the micro gas generator described herein may also be used, for example, with an airbelt (as exemplified in U.S. Pat. No. 6,685,220, incorporated herein by reference); with a buckle pretensioner (as exemplified in published U.S. Pat. No. 6,460,935, incorporated herein by reference); with a piston-based pyrotechnic actuator (as exemplified in U.S. Pat. No. 6,568,184, incorporated herein by reference), or with any other device incorporating a micro gas generator of the present invention within a vehicle occupant protection system. Additionally, the vehicle occupant protection system may also include, in addition to the device(s) containing the micro gas generator, other device(s) typically employed in vehicle occupant protection systems, such as an airbag system 200 as described above.

Unless otherwise noted, elements of the gas generator and pretensioner described herein may be formed using methods known in the art. In addition, a gas generator as described herein may be incorporated into any of a wide variety of alternative pretensioner designs. Furthermore, the embodiments of the gas generator described herein are not limited to use in seatbelt pretensioners, but may also be used in other applications. It will also be understood that the foregoing descriptions of embodiments of the present invention are for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A gas generating system comprising:
   a gas generant container;
   an initiator positioned separate from and external of the gas generant container so as to enable fluid communication with the container upon activation of the initiator, the position of the container being fixed with respect to the position of the initiator during combustion of the gas generant; and
   a gas generant charge in an interior of the container, for combusting to provide gas generant combustion products for actuating a device operatively coupled to the gas generating system, the gas generant container being penetrable by initiator combustion products,
   wherein, after activation of the initiator, initiator combustion products penetrate the container and initiate combustion of the gas generant charge, wherein the gas generant is hermetically sealed in a packet positioned within the container, and wherein the packet is penetrable by the initiator combustion products to initiate combustion of the gas generant charge.

2. The gas generating system of claim 1 wherein the container is spaced apart from the initiator.

3. The gas generating system of claim 1 wherein the container is in direct contact with the initiator.

4. A seatbelt device comprising:
a seatbelt retractor comprising a spool;
a seatbelt wound about said spool;
a seatbelt pretensioner including a gas generating system coupled thereto, the gas generating system including a gas generant container, an initiator positioned separate from and external of the gas generant container so as to enable fluid communication with the container upon activation of the initiator, and a gas generant composition positioned within the container, the gas generant container being penetrable by initiator combustion products, the position of the container being fixed with respect to the position of the initiator; and wherein the seatbelt pretensioner further includes a housing, a pliable strap positioned within the housing, the strap defining an expandable chamber adapted for receiving therein by-products from combustion of the gas generant composition upon activation of the gas generating system, and a compliant foil seal positioned at an interface between the strap and the housing for providing a substantially gas-tight seal between the strap and the housing, to substantially prevent egress of combustion by-products from the chamber prior to expansion of the chamber.

5. A vehicle occupant restraint system comprising a gas generating system in accordance with claim 1.

6. The vehicle occupant protection system of claim 5 wherein said gas generant container has sufficient rigidity to maintain a predetermined shape prior to positioning of the gas generant therein.

7. A gas generating system comprising:
a gas generant container;
an initiator positioned separate from and external of the gas generant container so as to enable fluid communication with the container upon activation of the initiator, the position of the container being fixed with respect to the position of the initiator during combustion of the gas generant; and
a gas generant charge in an interior of the container for supplying gas generant combustion products sufficient to fully actuate a device operatively coupled to the gas generating system, the gas generant contain being penetrable by initiator combustion products,
wherein, after activation of the initiator, initiator combustion products penetrate the container and initiate combustion of the gas generant charge.
wherein the gas generant is hermetically sealed in a packet positioned within the container, and wherein the packet is penetrable by the initiator combustion products to initiate combustion of the gas generant charge.

8. The gas generating system of claim 1 wherein the gas generating system contains a single gas generant charge adapted for supplying, upon combustion thereof, sufficient gas generant combustion products to fully actuate a device operatively coupled to the gas generating system.

9. A seatbelt device comprising a seatbelt pretensioner and a gas generating system in accordance with claim 1 operatively coupled to the pretensioner.

* * * * *

UNITED STATES PATENT AND TRADEMARK OFFICE
CERTIFICATE OF CORRECTION

PATENT NO. : 7,448,649 B2  Page 1 of 1
APPLICATION NO. : 11/282063
DATED : November 11, 2008
INVENTOR(S) : Dunham et al.

It is certified that error appears in the above-identified patent and that said Letters Patent is hereby corrected as shown below:

Column 2; Line 6; delete "cite" and insert --of--

Column 4; Line 38; please insert Pat. No. --6,505,837-- before U.S. Pat. No. 5,833,369

Column 8; Claim 7; Line 16; delete "." and insert --,--

Signed and Sealed this

Thirtieth Day of December, 2008

JON W. DUDAS
*Director of the United States Patent and Trademark Office*